United States Patent
Hevesi

(10) Patent No.: US 8,017,244 B2
(45) Date of Patent: Sep. 13, 2011

(54) COATED SUBSTRATE WITH A VERY LOW SOLAR FACTOR

(75) Inventor: Kadosa Hevesi, Jumet (BE)

(73) Assignee: AGC Flat Glass Europe SA, Watermael-Boitsfort (BE)

( * ) Notice: Subject to any disclaimer, the term of this patent is extended or adjusted under 35 U.S.C. 154(b) by 524 days.

(21) Appl. No.: 10/564,683

(22) PCT Filed: Jul. 16, 2004

(86) PCT No.: PCT/EP2004/051524
§ 371 (c)(1),
(2), (4) Date: May 24, 2006

(87) PCT Pub. No.: WO2005/012200
PCT Pub. Date: Feb. 10, 2005

(65) Prior Publication Data
US 2006/0246300 A1    Nov. 2, 2006

Related U.S. Application Data

(63) Continuation of application No. PCT/EP04/51524, filed on Jul. 16, 2004.

(30) Foreign Application Priority Data

Jul. 16, 2003   (EP) ..................... 03102196

(51) Int. Cl.
*B32B 17/06*   (2006.01)
*B32B 9/00*    (2006.01)
*B32B 19/00*   (2006.01)

(52) U.S. Cl. ........ 428/432; 428/433; 428/448; 428/336; 428/697; 428/698; 428/699; 428/701; 428/702; 428/450; 428/457; 428/469

(58) Field of Classification Search .................. None
See application file for complete search history.

(56) References Cited

U.S. PATENT DOCUMENTS

| | | |
|---|---|---|
| 4,902,581 A | 2/1990 | Criss |
| 5,110,662 A | 5/1992 | Depauw et al. |
| 5,153,054 A | 10/1992 | Depauw et al. |
| 5,800,933 A | 9/1998 | Hartig et al. |
| 5,948,538 A | 9/1999 | Brochot et al. |
| 5,965,246 A | 10/1999 | Guiselin et al. |
| 6,045,896 A | 4/2000 | Boire et al. |
| 6,190,776 B1 | 2/2001 | Demiryont |
| 2004/0147185 A1 | 7/2004 | Decroupet |
| 2005/0123772 A1 | 6/2005 | Coustet et al. |

FOREIGN PATENT DOCUMENTS

| | | |
|---|---|---|
| DE | 19616841 | 10/1996 |
| EP | 0718250 | 6/1996 |
| EP | 0761618 | 3/1997 |
| EP | 0792847 | 9/1997 |
| WO | WO-02/48065 | * 6/2002 |

* cited by examiner

*Primary Examiner* — Ling Xu
(74) *Attorney, Agent, or Firm* — Oblon, Spivak, McClelland, Maier & Neustadt, L.L.P.

(57) ABSTRACT

A transparent soda-lime glass substrate coated with a stack of layers including at least two infrared reflecting layers, each being directly adjacent to two light absorbent layers is provided. The coated substrate has a light absorption value between 35 and 67% and colorimetric indices of reflected color of a* between 0 and −10 and b* between 0 and −20. Glazing units containing the coated transparent soda-lime glass substrate are also provided.

25 Claims, No Drawings

COATED SUBSTRATE WITH A VERY LOW SOLAR FACTOR

CROSS-REFERENCE TO RELATED APPLICATIONS

This is the U.S. National Stage of PCT/EP2004/051524 filed 16 Jul. 2004, which claims priority from European Patent Application No. 03102196.7 filed 16 Jul. 2003, each of which is hereby incorporated by reference.

BACKGROUND OF THE INVENTION

The present invention relates to coated substrates, in particular transparent substrates coated with a stack of layers comprising one or more metal layers.

Such coated substrates are used, for example, as glazing units for buildings or vehicles, in single, double or laminated structures and as optical filters.

It is desirable that glazing units for buildings or vehicles do not allow too substantial a proportion of total incident solar radiation to pass through so as not to overheat the interior of the building or the passenger compartment, while providing a light transmission (LT=percentage of incident light flux—of illuminant D65—transmitted by a substrate) that is suitable in order to supply a sufficient level of illumination to the interior of the building. The transmission of the total incident solar radiation can be expressed in terms of the solar factor (SF=percentage of incident energy radiation, which, on the one hand, is directly transmitted by the substrate and, on the other hand, is absorbed by this then radiated by its opposite face to the energy source). These somewhat conflicting requirements express the requirement to obtain a glazing unit with an elevated selectivity (S), defined by the ratio of light transmission to the solar factor. It is also desirable that glazing units meet certain aesthetic criteria in terms of light reflection (LR=percentage of incident light flux—of illuminant D65—reflected by a substrate) and reflected colour.

The light absorption (LA) is the percentage of incident light flux (of illuminant D65) absorbed by a substrate, the sum of LT+LR+LA being equal to 100%.

The present description uses the definitions of the Internationale Commission on Illumination—"Commission Internationale de l'Edairage" (CIE).

Substrates bearing a coating with a high light transmission, low emissivity and reduced solar factor are known. The patent documents FR 2.641.271 and FR 2.641.272 of the Applicant describe a substrate of vitreous material bearing a multilayer coating, which comprises a reflective layer of silver sandwiched between two transparent and non-absorbent layers, one on the bottom and one on the top.

The patent document FR 2.733.495 of the Applicant describes sun protection stacks based on two layers of silver separated by non-absorbent layers, in particular of metal oxides. A fine sacrificial metal layer is deposited on each of the silver layers. This fine metal layer acts as a barrier to protect the silver layer from oxidation when the upper metal oxide layer is deposited. Its thickness is adjusted so that when the upper layer is deposited, it oxidises sufficiently to permit a maximum light transmission. In FR 2.733.495 the stack retains a high light transmission in the order of 76% on a 6 mm single clear glass substrate and a low absorption. The solar factor is in the order of 43% when the substrate is a 6 mm single clear glass sheet and in the order of 37% for a double glazing unit.

To further decrease the solar factor of the glazing a possibility could be to increase the thickness of the metal layer(s) of the stack or to increase the number of metal layers. However, this has the disadvantage of increasing the light reflection (LR) and of producing reflected colours in the glazing that are generally considered unpleasing.

U.S. Pat. No. 6,190,776 describes a heat treatable stack formed from a first dielectric layer/a first layer of Cr/a layer of Ag or Cu/a second layer of Cr/a second dielectric layer. This stack provides non-neutral reflected colours both before and after thermal treatment. For architectural applications with a low solar factor, the colorimetric index a* varies between 1.35 and 10.30 and index b* varies between −7.80 and 31.70, which gives purple to orange colourations. The light absorption of the glazing are around 23% after heat treatment.

Metallic barriers are also known that have a protective function during a subsequent thermal treatment. These barrier layers do not remain metallic, but oxidise during the thermal treatment and are no longer absorbent.

There are also sun protection stacks comprising absorbent layers. However, it is not obvious to add an absorbent layer without causing the light transmission to fall. Therefore, it is particularly difficult to maintain a significant selectivity while retaining a stack that is neutral (or aesthetically acceptable) in reflection.

EP 185 314 describes a stack comprising an absorbent layer, a layer of silver and a fine layer of stainless steel. The light reflection in this case is very high (up to 67%) and the LT is not more than 12%. These characteristics do not meet the desired criteria.

Stacks of the type $Si_3N_4/NiCr/Ag/NiCr/Si_3N_4$ are described in U.S. Pat. No. 5,800,933. Non-absorbent layers of $Si_3N_4$ can be doped with stainless steel. The nickel-chromium layers have thicknesses in the order of 0.7 to 0.8 nm. These stacks are adapted to obtain a light transmission of more than 70% and a low emissivity. The total absorption of such a stack on a clear glass is very low (in the order of 14% in a double glazing, LT=70%, LR=16%).

WO 02/48065 describes stacks with double layers of silver comprising an absorbent layer inserted directly between two dielectric layers. This absorbent layer must be placed either between the two layers of silver, "in" the intermediate dielectric, or "in" the upper dielectric. The solar factor attained is 26 to 31% in double glazing. The aim of these stacks is to preserve good optical properties after toughening. The insertion of an absorbent layer between two dielectric layers has the drawback to complicate the manufacturing process. Indeed, the deposition conditions of the dielectric layer (in non metallic condition) must be interrupted to deposit an absorbing layer in metallic conditions.

EP 1 032 543 describes a sun protection stack comprising a non-absorbent layer, a first infrared reflective layer, a sacrificial barrier, a second non-absorbent layer, a second infrared reflective layer, a second sacrificial barrier and a last non-absorbent layer. An absorbent layer is added under either one of the infrared reflective layers. Such stacks have a solar factor in the order of 31% (in double glazing).

However, there is a need to provide coated substrates, wherein the solar factor is still lower and the other optical characteristics remain favourable: low reflection from the coated side and from the non-coated side, high selectivity, aesthetically pleasing reflected colour etc.

SUMMARY OF THE INVENTION

It has been discovered that the required combination of optical properties can be achieved and other advantages obtained by a substrate coated with different layers in accordance with the present invention.

The present invention in particular relates to a substrate coated with a stack of layers, comprising, in succession starting from the substrate, at least:
  i) a layer of dielectric material,
  ii) an absorbent layer,
  iii) an infrared reflective layer,
  iv) an absorbent layer,
  v) a layer of dielectric material,
the thickness and the nature of the layers being selected such that the stack of layers would provide a 6 mm clear soda-lime glass with a light absorption (with respect to the glass side: $LA_g$) higher than or equal to 35%, preferably higher than 37%, and further preferred higher than 39%, and lower than 67%, preferably lower than 60%, and further preferred lower than 55%. It is to be noted that the light absorption to be considered is the light absorption of the finished product, the coated substrate being either heat treated or not heat treated.

The term substrate should be understood to mean any transparent substrate generally made of vitreous material, whether clear or coloured: glass, glass ceramic, organic glass, polycarbonate, PET, various transparent polymers; in particular of soda-lime glass.

It is particularly advantageous if the stack comprises at least two infrared reflective layers deposited in the following sequence, starting from the substrate:
  a first layer of dielectric material,
  a first absorbent layer,
  a first infrared reflective layer,
  an intermediate layer,
  a last infrared reflective layer,
  a last absorbent layer,
  a last layer of dielectric material.

A further possibility could be to deposit more than two infrared reflective layers. In this case, at least a first absorbent layer must be deposited between the first layer of dielectric material and the first reflective layer and at least a second absorbent layer must be deposited between the last reflective layer and the last layer of dielectric material, each reflective layer being separated from the following one by an intermediate layer, in particular a layer of dielectric material, and/or possibly a barrier layer. Hence, all the reflective layers are sandwiched between the 2 absorbent layers. Therefore, in the above sequence of layers, it is the intermediate layer, which can be replaced by an alternating arrangement of intermediate/reflective/intermediate layers.

It is also possible to deposit more than two absorbent layers. Therefore, the possibility is not excluded to deposit one or more absorbent layers between two layers of infrared reflective materials.

The total thickness of the infrared reflective layer or layers is generally greater than 10 nm, preferably in the range of between 13 and 40 nm, and further preferred between 18 and 35 nm. In the special case where the stack comprises two layers of silver, the total thickness of the two layers is preferably greater than 25 nm, and further preferred greater than 27 nm.

In particular, the stack according to the invention comprises a sacrificial layer disposed between the infrared reflective layer and the following dielectric layer.

According to a preferred embodiment of the invention, the stack essentially consists of a succession of the following layers, starting from the substrate:
  a) a layer of dielectric material,
  b) an absorbent layer,
  c) an infrared reflective layer,
  d) a sacrificial barrier,
  e) a layer of dielectric material,
  f) an infrared reflective layer,
  g) an absorbent layer also having the function of a barrier,
  h) a layer of dielectric material.

The dielectric materials of the layers can be selected from metal oxides, nitrides and oxynitrides, e.g. aluminium oxide ($AlO_x$), aluminium nitride ($AlN_x$), aluminium oxynitride ($NAlN_xO_y$), magnesium oxide (MgO), niobium oxide ($NbO_x$), silicon dioxide ($SiO_x$), silicon nitride ($SiN_x$), titanium dioxide ($TiO_x$), bismuth oxide ($BiO_x$), yttrium oxide ($YO_x$), tin oxide ($SnO_x$), tantalum oxide ($TaO_x$), zinc oxide ($ZnO_x$), zirconium oxide ($ZrO_x$), zinc stannate ($ZnSn_xO_y$) or from sulphides such as zinc sulphide ($ZnS_x$). These compounds can be in stoichiometric or non-stoichiometric form. In general, these compounds have a spectral absorption index k over the entire visible spectrum of lower than 0.1.

These compounds can be used alone or in mixture. They constitute transparent, non-absorbent materials, which allow the light reflection LR to be adjusted and colours reflected by optical interference effects to be neutralised. A dielectric layer can comprise two or more layers of different material.

The materials of the absorbent layers are selected from materials having a spectral absorption index on the wavelength of 580 nm ($k_{580}$) higher than 0.8, in particular higher than 1, and further preferred higher than 1.2. Such materials are, for example, metals such as titanium, zirconium, stainless steel, niobium, zinc, chromium, nickel, and alloys of these metals, or metal nitrides such as titanium or zirconium nitride.

The materials of the infrared reflective layers generally comprise silver or alloys of silver with other metals such as platinum or palladium.

When the substrate is a clear soda-lime sheet of glass with a thickness of 6 mm, the light transmission of the coated substrate is preferably higher than 25%, and further preferred higher than 30%, and is preferably lower than 60%, preferably lower than 55%, and further preferred lower than 50%. The light reflection both with respect to the layer ($LR_c$) and with respect to the substrate ($LR_g$) of the coated substrate is preferably lower than 30%, more preferred lower than 23%, and further preferred lower than 20%, and is generally higher than 8%, and in particular higher than 10%. The LR values with respect to the layer or with respect to the substrate are, of course, not necessarily identical.

In a preferred manner, the coated substrate according to the invention has an aesthetically pleasing reflected colour, i.e. which is neither pink nor yellow, but neutral or bluish or turquoise. In particular, the reflected colour, with respect to the glass, has a colorimetric index $a_g^*$ in the range of between 0 and −10, preferably in the range of between −1 and −8, and a colorimetric index $b_g^*$ in the range of between 0 and −20, preferably in the range of between −1 and −15, and further preferred between −2 and −10. $b^*$ is preferably lower than $a^*$. These values are expected for the finished products, either heat treated or not.

The coated substrates according to the invention can be incorporated in particular into single or multiple glazing units in buildings, in particular double glazing units, but also in laminated glazing units, and used for automotive applications such as the roofs of vehicles, side rear windows or rear windows.

In a double glazing, the sun protection coating according to the invention could be deposited in position 2 or possibly in position 3, the faces of each of the two glass sheets being numbered from the outside of the buildings inwards.

Advantageously, the solar factor of a double glazing (6 mm sheet-space of 15 mm-6 mm sheet) is lower than 35%, preferably lower than 30%, and further preferred lower than 26%. The selectivity of the double glazing (LT/SF) is preferably higher than 1.3, preferably higher than 1.5.

The glazing according to the invention advantageously has a reflected colour, with respect to the outside, wherein the colorimetric index a* is in the range of between 0 and −10, preferably in the range of between −1 and −8, and the colorimetric index b* is in the range of between 0 and −20, preferably between −1 and −15, and further preferred between −2 and −10.

Moreover, the glazing according to the invention has an angular stability such that, when the angle of incidence varies from 60°, the variation in the colorimetric indexes a* and b* is less than 6, preferably less than 4, and further preferred less than 2.

In a preferred embodiment, the glazing according to the invention comprises a coated substrate which combines the following characteristics: a LT comprised between 30 and 55%, preferably between 31 and 46%, a LR, with respect to the non coated side, comprised between 8 and 25%, preferably between 9 and 24%, and colorimetric indexes with respect to the non coated side: a* comprised between 0 and −8, preferably between 0 and −5, and b* comprised between 0 and −20, preferably between −2 and −18.

DETAILED DESCRIPTION

The present invention is described in more detail in a non-restrictive manner in the following examples.

EXAMPLES

Each of the examples corresponds to a product formed from a substrate sheet of clear soda-lime glass with a thickness of 6 mm, which is introduced into a coating line comprising successive vacuum deposition chambers (at a pressure of about 0.3 Pa) containing magnetron-assisted sputtering cathodes.

Example 1

The following stack of successive layers is manufactured as follows:
  a first dielectric layer of zinc oxide with a thickness of 39 nm is deposited by sputtering a metal target of zinc in a reactive atmosphere of oxygen.
  a first absorbent layer of titanium with a thickness of 4.5 nm is deposited by sputtering a metal target of titanium in an inert atmosphere of argon.
  a first layer of silver with a thickness of 17 nm is deposited by sputtering a metal target of silver in an inert atmosphere of argon.
  a 2 nm barrier layer of titanium is deposited by sputtering a titanium target in an inert atmosphere of argon. This layer will in fact oxidise during deposit of the following layer over most of its thickness. It should be noted that once oxidised, the layer has a greater thickness than the one it would have had in a metallic state.
  a second dielectric layer of zinc oxide with a thickness of 84 nm is deposited by sputtering a metal target of zinc in a reactive atmosphere of oxygen.
  a second layer of silver with a thickness of 14 nm is deposited by sputtering a metal target of silver in an inert atmosphere of argon.
  a second absorbent 4 nm layer of titanium is deposited by sputtering a metal target in an inert atmosphere. This layer has a dual function: it constitutes a sacrificial protective barrier for the silver layer by preventing all contact of the silver layer with the reactive atmosphere of the following layer, but it is sufficiently thick for a substantial portion of its thickness to remain metallic. Of the 4 nm thickness deposited, it is estimated that half the titanium deposited will oxidise and that 2 nm of the thickness will remain metallic. In the completed stack, therefore, there will be 2 nm of metallic Ti and approximately 4 nm of $TiO_2$.
  a third dielectric layer of zinc oxide 28 nm thick is deposited by sputtering a metal target of zinc in a reactive atmosphere of oxygen.

The optical properties of the substrate coated with this stack are collated in Table II below.

Examples 2 to 14

The stacks of examples 2 to 14 can be deposited using the same operating method as in example 1. Table I below indicates the nature and thickness of the different layers deposited in each of the examples. The thicknesses are given in nm and are the thicknesses of the layers as deposited before any oxidation stage.

TABLE I

|  | i) | ii) | iii) | iv) | v) | vi) | vii) | viii) | ix) | x) |
|---|---|---|---|---|---|---|---|---|---|---|
| Ex. 1 | ZnO | Ti | Ag | Ti | ZnO | x | Ag | Ti |  | ZnO |
| (nm) | 39 | 4.5 | 17 | 2 | 84 |  | 14 | 4 |  | 28 |
| Ex. 2 | ZnO | Ti | Ag | Ti | ZnO | x | Ag | Ti |  | ZnO |
| (nm) | 35 | 5 | 17 | 2 | 80 |  | 17 | 5.5 |  | 25 |
| Ex. 3 | SnO2 | Ti | Ag | Ti | SnO2 | x | Ag | Zn |  | SnO2 |
| (nm) | 39 | 4.5 | 17 | 2 | 84 |  | 14 | 3 |  | 29 |
| Ex. 4 | TiO$_2$/ZnO | Ti | Ag | Ti | ZnO | x | Ag | Ti |  | ZnO |
| (nm) | 20/9 | 4.5 | 17 | 2 | 88 |  | 14.8 | 4 |  | 30 |
| Ex. 5 | ZnO | Zr | Ag | Ti | ZnO | x | Ag | Ti |  | ZnO |
| (nm) | 35 | 4.5 | 17 | 2 | 84 |  | 14 | 4 |  | 28 |
| Ex. 6 | ZnO | ZrN | Ag | Ti | ZnO | x | Ag | Ti |  | ZnO |
| (nm) | 38 | 12 | 17 | 2 | 84 |  | 15 | 4 |  | 28 |
| Ex. 7 | ZnO | SS | Ag | Ti | ZnO | x | Ag | Ti |  | ZnO |
| (nm) | 38 | 4.5 | 17 | 2 | 88 |  | 15 | 4 |  | 32 |
| Ex. 8 | ZnO | SS | Ag | Ti | ZnO | x | Ag | Ti |  | ZnO |
| (nm) | 45 | 6.5 | 16.5 | 2 | 88 |  | 16 | 4 |  | 33 |
| Ex. 9 | ZnO | SS | Ag | Ti | ZnO | x | Ag | Ti |  | ZnO |
| (nm) | 38 | 6 | 17.5 | 2 | 80 |  | 14 | 4 |  | 28 |
| Ex. 10 | ZnO | Nb | Ag | Ti | ZnO | x | Ag | Nb | Ti | ZnO |
| (nm) | 35 | 4.5 | 17 | 2 | 84 |  | 15.5 | 3 | 2 | 28 |

TABLE I-continued

|  | i) | ii) | iii) | iv) | v) | vi) | vii) | viii) | ix) | x) |
|---|---|---|---|---|---|---|---|---|---|---|
| Ex. 11 (nm) | $Si_3N_4$/ZnO 25/6.5 | Ti 4 | Ag 17 | Ti 2 | $Si_3N_4$/ZnO 84/6.5 | x | Ag 14 | Ti 4 | | $Si_3N_4$ 31 |
| Ex. 12 (nm) | Si3N4 29 | Ti 4 | Ag 17 | Ti 2 | $Si_3N_4$ 88 | x | Ag 14 | Ti 4 | | $Si_3N_4$ 31 |
| Ex. 13 (nm) | Si3N4 29 | Ti 4 | Ag 17 | Ti 2 | $Si_3N_4$ 84 | x | Ag 17 | Ti 4 | | $Si_3N_4$ 31 |
| Ex. 14 (nm) | Si3N4 31 | Ti 4 | Ag 18.5 | Ti 2 | $Si_3N_4$ 84 | Ti 2 | Ag 16 | Ti 4 | | $Si_3N_4$ 23 |

The optical properties of each of the coated substrates are collated in Table 11 below. The solar factor (SF) values are calculated according to the En 410 standard.

TABLE II

|  | Single Glazing | | | | | | Double Glazing | | | |
|---|---|---|---|---|---|---|---|---|---|---|
|  | LT % | $LR_g$% | $a_g^*$ | $b_g^*$ | $AL_g$% | $LR_c$% | LT % | SF % | S | LR % |
| Ex. 1 | 42.4 | 13.7 | −0.9 | −5.6 | 43.9 | 18.5 | 38.2 | 21.2 | 1.80 | 15.2 |
| Ex. 2 | 36.0 | 12.0 | −2.3 | −18.1 | 52.0 | 13.1 | 32.4 | 16.0 | 2.02 | 13.3 |
| Ex. 3 | 40.1 | 13.5 | −1.5 | −5.2 | 46.4 | 12.6 | 36.0 | 20.6 | 1.75 | 15.0 |
| Ex. 4 | 44.2 | 12.8 | −1.3 | −4.1 | 43.0 | 18.2 | 39.8 | 22.1 | 1.80 | 14.3 |
| Ex. 5 | 45.9 | 14.3 | −0.7 | −8.9 | 39.8 | 19.6 | 41.3 | 23.0 | 1.80 | 15.8 |
| Ex. 6 | 45.2 | 17.8 | −1.0 | −6.9 | 36.7 | 23.7 | 41.0 | 20.9 | 1.96 | 19.7 |
| Ex. 7 | 40.2 | 11.8 | −1.1 | −3.7 | 48.0 | 14.0 | 36.0 | 19.7 | 1.83 | 13.1 |
| Ex. 8 | 35.1 | 12.0 | −1.7 | −3.3 | 52.9 | 14.4 | 31.6 | 16.5 | 1.92 | 13.3 |
| Ex. 9 | 35.0 | 12.5 | −1.1 | −6.9 | 52.5 | 15.9 | 31.5 | 18.0 | 1.75 | 13.8 |
| Ex. 10 | 40.1 | 11.9 | −3.5 | −11.2 | 48.0 | 17.3 | 36.1 | 20.2 | 1.78 | 13.2 |
| Ex. 11 | 41.4 | 16.6 | −2.1 | −5.0 | 42.0 | 18.2 | 37.3 | 22.8 | 1.63 | 18.1 |
| Ex. 12 | 41.1 | 16.4 | −1.3 | −5.6 | 42.5 | 16.3 | 37.0 | 22.4 | 1.65 | 17.9 |
| Ex. 13 | 42.3 | 13.7 | −0.7 | −15.3 | 44.0 | 9.4 | 38.1 | 20.9 | 1.82 | 15.2 |
| Ex. 14 | 31.3 | 14.5 | −1.5 | −11.6 | 54.2 | 16.4 | 28.1 | 15.7 | 1.79 | 15.4 |

The invention claimed is:

1. A transparent substrate coated with a stack of layers consisting essentially of, in succession starting from the transparent substrate:
   a) a first layer of dielectric material;
   b) a first absorbent layer;
   c) a first infrared reflective layer;
   d) optionally a sacrificial barrier layer;
   e) an intermediate layer;
   f) optionally a metal layer;
   g) a last infrared reflective layer;
   h) a last absorbent layer;
   i) optionally a sacrificial barrier layer; and
   j) a last layer of dielectric material;
   wherein when the transparent substrate is a 6 mm clear soda-lime glass, a light absorption value of the coated transparent substrate is between 35 and 67%, a colorimetric index a* of a reflected colour, with respect to the clear soda-lime glass, is between 0 and −10, and a colorimetric index b* of a reflected colour, with respect to the clear soda-lime glass is between 0 and −20, and
   wherein the absorbent layers comprise a material selected from the group consisting of titanium, zirconium, stainless steel, niobium, zinc, nickel, an alloy of these metals and nitrides thereof.

2. The transparent coated substrate according to claim 1, wherein the transparent coated substrate comprises at least one feature selected from the group consisting of (A), (B), (C) and (D):
   (A) at least one sacrificial layer disposed between an infrared reflective layer and a following layer of dielectric material;
   (B) the dielectric layers comprise one or more compounds selected from the group consisting of aluminium oxide ($AlO_x$), aluminium nitride ($AlN_x$), aluminium oxynitride ($AlN_xO_y$), magnesium oxide ($MgO_x$), niobium oxide ($NbO_x$), silicon dioxide ($SiO_x$), silicon nitride ($SiN_x$), titanium dioxide ($TiO_x$), bismuth oxide ($BiO_x$), yttrium oxide ($YO_x$), tin oxide ($SnO_x$), tantalum oxide ($TaO_x$), zinc oxide ($ZnO_x$), zirconium oxide ($ZrO_x$), zinc stannate ($ZnSn_xO_y$) and zinc sulphide ($ZnS_x$);
   (C) at least one infrared reflective layer comprises silver or an alloy of silver with other metals; and
   (D) the absorbent layers comprise a material having a spectral absorption index at a wavelength of 580 nm ($k_{580}$) higher than 0.8.

3. The transparent coated substrate according to claim 2, which comprises at least two of the features (A) through (D).

4. The transparent coated substrate according to claim 2 which comprises at least three of the features (A) through (D).

5. The transparent coated substrate according to claim 2, which comprises all of the features (A) through (D).

6. The transparent coated substrate according to claim 1, wherein the coated transparent substrate comprises at least one feature selected from the group consisting of (E), (F), (G) and (H):
   (E) a light transmission of the coated transparent substrate, is between 25 and 60%,
   (F) a light reflection with respect to a coated layer side ($LR_c$) of the coated transparent substrate is less than 30%,
   (G) a light reflection with respect to a non coated side ($LR_v$) of the coated transparent substrate is lower than 30%,
   (H) a total thickness of the infrared reflective layers is greater than 10 nm.

7. The transparent coated substrate according to claim 6 which comprises at least two of the features (E) through (H).

8. The transparent coated substrate according to claim 6 which comprises at least three of the features (E) through (H).

9. The transparent coated substrate according to claim 6 which comprises all of the features (E) through (H).

10. The transparent coated substrate according to claim 6, wherein the transparent substrate comprises at least one feature selected from the group consisting of (E), (F), (G) and (H):
    (E) a light transmission of the coated transparent substrate, is between 30 and 55%,
    (F) a light reflection with respect to the coated layer side ($LR_c$) of the coated transparent substrate is between 10 and 20%,
    (G) a light reflection with respect to the non coated side ($LR_v$) of the coated transparent substrate is between 10 and 18%,
    (H) a total thickness of the infrared reflective layers is between 18 and 35 nm.

11. The transparent coated substrate according to claim 1, wherein the colorimetric index a* is between −1 and −8; and the colorimetric index b* is between −1 and −15.

12. The transparent coated substrate according to claim 1, wherein the intermediate layer comprises a sequence of layers as follows:
    a) a first dielectric layer,
    b) an infrared reflective layer, and
    c) a second layer of dielectric material.

13. A glazing comprising the coated transparent substrate according to claim 1, wherein a solar factor of the glazing is less than 35%.

14. The glazing according to claim 13 which has a selectivity (LT/SF) higher than 1.3.

15. The glazing according to claim 13, wherein
    a colorimetric index a* of reflected colour with respect to an outside is between 0 and −10, and
    a colorimetric index b* of reflected colour with respect to the outside is between 0 and −20.

16. The glazing according to claim 13, wherein
    a light transmission is between 30 and 55%,
    a light reflection, with respect to the non coated side, is between 8 and 25%,
    a colorimetric index a* with respect to the non coated side, is between 0 and −8 and
    a colorimetric index b* with respect to the non coated side, is between 0 and −20.

17. The transparent coated substrate according to claim 1, wherein the last infrared reflective layer is in direct contact with the last absorbent layer.

18. The transparent coated substrate according to claim 1, wherein the light absorption value of the transparent coated substrate is between 39 and 55%, the colorimetric index a* of reflected colour is between −1 and −8, and the colorimetric index b* of reflected color is between −1 and −10.

19. The transparent coated substrate according to claim 1, wherein the first absorbent layer has a thickness of between 4 and 12 nm.

20. The transparent coated substrate according to claim 1, wherein the last absorbent layer has a thickness of between 3 nm and 5.5 nm.

21. A transparent substrate coated with a stack of layers consisting essentially of, in succession starting from the transparent substrate:
    a) a first layer of dielectric material;
    b) a first absorbent layer;
    c) a first infrared reflective layer;
    d) optionally a sacrificial barrier layer;
    e) an intermediate layer;
    f) optionally a metal layer;
    g) a last infrared reflective layer;
    h) a last absorbent layer;
    i) optionally a sacrificial barrier layer; and
    j) a last layer of dielectric material;
    wherein the absorbent layers comprise a material selected from the group consisting of titanium, zirconium, stainless steel, niobium, zinc, nickel, an alloy of these metals and nitrides thereof.

22. The transparent coated substrate according to claim 21, wherein the last absorbent layer has a thickness of between 3 nm and 5.5 nm.

23. The transparent coated substrate according to claim 22, wherein when the transparent substrate is a 6 mm clear soda-lime glass, a light absorption value of the coated transparent substrate is between 35 and 67%, a colorimetric index a* of a reflected colour, with respect to the clear soda-lime glass, is between 0 and −10, and a colorimetric index b* of a reflected colour, with respect to the clear soda-lime glass is between 0 and −20.

24. The transparent coated substrate according to claim 22, wherein the first absorbent layer has a thickness of between 4 and 12 nm.

25. The transparent coated substrate according to claim 22, wherein
    a light transmission of the coated transparent substrate is between 30 and 55%, and
    the transparent substrate comprises at least one feature selected from the group consisting of (F), (G) and (H):
    (F) a light reflection with respect to the coated layer side ($LR_c$) of the coated transparent substrate is between 10 and 20%,
    (G) a light reflection with respect to the non coated side ($LR_v$) of the coated transparent substrate is between 10 and 18%,
    (H) a total thickness of the infrared reflective layers is between 18 and 35 nm.

* * * * *